(12) United States Patent
Becke et al.

(10) Patent No.: US 8,931,788 B2
(45) Date of Patent: Jan. 13, 2015

(54) LIFT AXLE VALVE UNIT

(75) Inventors: Stefan Becke, Altlussheim (DE); Tobias Tschöke, Heidelberg (DE); Georg Sulzyc, Edingen-Neckarhausen (DE)

(73) Assignee: Haldex Brake Products GmbH, Heidelberg (DE)

( * ) Notice: Subject to any disclaimer, the term of this patent is extended or adjusted under 35 U.S.C. 154(b) by 0 days.

(21) Appl. No.: 13/589,731

(22) Filed: Aug. 20, 2012

(65) Prior Publication Data

US 2013/0048101 A1   Feb. 28, 2013

(30) Foreign Application Priority Data

Aug. 26, 2011 (DE) .......................... 10 2011 053 031

(51) Int. Cl.
*B62D 61/12* (2006.01)
(52) U.S. Cl.
USPC ........................................................ 280/86.5
(58) Field of Classification Search
USPC ............ 280/86.5, 5.514, 6.157, 6.159, 6.151; 251/129.01; 137/625.65
See application file for complete search history.

(56) References Cited

U.S. PATENT DOCUMENTS

| | | | |
|---|---|---|---|
| 5,273,308 A * | 12/1993 | Griffiths .................... | 280/6.151 |
| 8,172,339 B2 * | 5/2012 | Fries et al. .................. | 303/11 |
| 8,382,448 B2 * | 2/2013 | Fries et al. .................. | 417/223 |
| 2007/0246999 A1 * | 10/2007 | Hilberer ...................... | 303/13 |
| 2008/0197064 A1 | 8/2008 | Blasco Remacha | |
| 2010/0200485 A1 | 8/2010 | Parra Navarrete | |
| 2011/0101257 A1 | 5/2011 | Morris | |
| 2011/0175301 A1 * | 7/2011 | Naber .......................... | 280/5.5 |

FOREIGN PATENT DOCUMENTS

| | | |
|---|---|---|
| DE | 3638849 A1 | 5/1988 |
| DE | 8911010 U1 | 1/1990 |
| DE | 4037461 C1 | 5/1992 |
| DE | 4314994 C1 | 9/1995 |
| DE | 4410892 C2 | 10/1995 |
| DE | 102004051812 A1 | 8/2006 |
| DE | 1020060340711 A1 | 2/2007 |
| DE | 19905113 B4 | 1/2008 |
| DE | 102007005771 DE | 8/2008 |
| EP | 0170794 B1 | 10/1989 |
| EP | 0487928 B1 | 3/1995 |

\* cited by examiner

*Primary Examiner* — Faye M. Fleming
(74) *Attorney, Agent, or Firm* — Thomas | Horstemeyer, LLP (57) ABSTRACT

The invention relates to a lift axle valve unit of any type for lifting or lowering a lift axle of a utility vehicle having an air suspension.

According to the invention, the lift axle valve unit comprises a heating device. By means of the heating device it Is possible to heat the lift axle valve unit when using the utility vehicle in regions and in wintertime with low temperatures. The heating device comprises a heating element built with a heating rod or a heating mat.

12 Claims, 4 Drawing Sheets

LIFT AXLE VALVE UNIT

CROSS REFERENCE TO RELATED APPLICATIONS

This application claims priority to co-pending German Patent Application No. DE 10 2011 053 031.2 entitled "Liftachsventileinheit", filed Aug. 26, 2011.

FIELD OF THE INVENTION

The present invention generally relates to a lift axle valve unit designated for use in a utility vehicle comprising an air suspension. In particular, the utility vehicle is a trailer, a tractor, a bus or a semitrailer.

BACKGROUND OF THE INVENTION

Lift axle valve units are used for adapting the number of the load carrying axles of the utility vehicle to the actual needs. For an empty utility vehicle or a load of the vehicle below a threshold one or a plurality of lift axles are lifted so that these axle(s) have no contact with the road. When exceeding a threshold of the load, the lift axle valve unit automatically lowers at least one lift axle for distributing the load to an increased number of axles. This is done by deaerating lift bellows which in the aerated state lift the lift axle. At the same time with deaerating the lifting bellows additional air suspension bellows of the lift axle are aerated for supporting the axle load of the lift axle. The intention for a change of the number of the load carrying axles of the utility vehicle is also to minimize wear at the load carrying axles and/or a provision of an improved brake behavior for varying loads. It is also possible to change the number of the load carrying axles in case that fees as tolls depend on the number of axles being in contact with the road. The lift axle valve unit might also be responsible for changing the pneumatic pressure of the air suspension bellows of permanently active axles as well as of an activated lift axle to a desired distribution for carrying the axle loads. The lift axle might also be additionally used for keeping a required maximum of the brake force produced by a brake device with an increased load (and corresponding increased normal force between the wheels and the road) below an upper limit value. This is due to the fact that excess brake forces cannot be produced by brake force actuators or these excess brake forces cannot be withheld for longer time periods. Accordingly, with an increase of the load without the additional lowering of the lift axle the brake device would be overloaded. It might also be impossible to produce the required brake force which might result in an increased braking distance.

DE 199 05 113 B4 discloses the option to intentionally lift a lift axle for a short time interval. This is done for purposefully overloading a drive axle of the utility vehicle in order to support a driveway of the vehicle on slippery ground.

A plurality of different lift axle valve units providing at least some of the aforementioned functions is known from the prior art. As some examples for design of lift axle valve units the publications US 2011/0101257 A1, EP 0 170 794 B1, DE 44 10 892 C2, DE 43 14 994 C1, DE 40 37 461 C1 (corresponding to EP 0 487 928 B1), DE 36 38 849 A1 and DE 89 11 010 U1 are cited. Known lift axle valve units are controlled manually, automatically, mechanically, pneumatically and/or electronically, wherein the control might base on a closed or open loop control.

DE 10 2004 051 812 A1 (corresponding to US 2007/0246999 A1) discloses a pressurized air supply device including an air treatment module. A heating device is located close to an electronic control unit of the air treatment module. The designated function of the heating device is not further specified in the patent application. Apparently the heating devices serves for keeping the temperature of the electronic control unit above a temperature limit or to protect an air dryer and/or a pressure regulator against freezing. The pressurized air supply device also includes a lift axle module which is located separately from the air treatment module and located distant from the heating device.

SUMMARY OF THE INVENTION

The present invention bases on the finding that during the use of a utility vehicle equipped with a lift axle at low environmental temperatures the lift axle function might be compromised. This might also be the case if the environmental temperatures during the use of the utility vehicle at daytimes are not very low whereas the temperatures drops to low values during nighttimes. For a non-limiting example, the environmental temperature at nighttimes might be lower than −40° C. when using the utility vehicle in Canada or Scandinavia. These low temperatures lead to a cool down of the lift axle valve unit. Due to an isolation and the thermal capacity of the lift axle valve unit, the low temperature of the lift axle valve unit is also withheld with an increase of the environmental temperature with the start of the day. A low temperature of the lift axle valve unit might have the result that the lift axle valve unit comprises an excess leakage which might be due to changed tolerances by thermal size changes or only partially closed valve seats. It is also possible that valve elements of the lift axle valve unit freeze with neighboring elements. Furthermore, in some cases due to changed pneumatic conditions caused by the low temperature or changing frictional characteristics it is not possible to move the valve elements of the lift axle valve unit by the given actuators. In the worst case, an increased loading of the utility vehicle does not result in the required lowering of the lift axle which results in an excess load at the other axles. One consequence of this excess load at the other axles is an excess wear at the wheels of these axles. On the other hand, it is also possible that a lift axle is not lifted as intended when unloading the utility vehicle.

Generally, when starting the utility vehicle to some extent the pneumatic elements get heated. This heating is due to the supply of pressurized air with an increased temperature by a compressor. Also with the start of a brake operation braking energy transformed at the brakes into heat might be transferred via a housing and support structures to the lift axle valve unit. However, in case that due to the low temperatures the lift axle is not lowered as desired (due to the missing brake actuation of the brakes of the lift axle) this heating effect does not occur at the lift axle. Furthermore, in some cases the lift axle valve unit is located at the "end of the pneumatic chain". Accordingly, a heating of the lift axle valve unit by heated pressurized air takes place only after approximately one hour of driving with the lift axle in the wrong position. The described problem gets worse in case that the lift axle valve unit is exposed to the cold air stream of the moving vehicle. The stream of cold air leads to a retardation of any heating process at the lift axle valve unit.

The invention suggests equipping the lift axle valve unit with a heating device. By means of the heating device (alternatively or cumulatively to the aforementioned mechanisms for heating the lift axle valve unit) a heating of the lift axle valve unit might be provided as demanded. The heating device might be a compact heating device or a distributed device with a plurality of components of any design. It is possible that the components are dispersed over the lift axle valve unit at suitable positions. The heating device or the aforementioned components might at least partially be integrated into a housing of the lift axle valve unit or into any component or might be attached to a housing of the lift axle valve unit.

For one embodiment of the invention, the heating device builds a module. It is possible to combine this module as a whole with a base module of the lift axle valve unit, in particular with the housing of the lift axle valve unit. To mention some examples, it is possible to attach the module at the outside of the housing or to integrate the module into the housing. It is possible that the module is pre-manufactured or preassembled by the manufacturer of the base module of the lift axle valve unit or by any other manufacturer. Furthermore, it is possible that the lift axle valve unit is distributed in two variants, namely one variant with the module building the heating device for countries with expected low temperature and another variant without the module building the heating device for use of the utility vehicle with the lift axle valve unit in countries or regions or in a season where no low temperatures are expected. It is also possible that one and the same vehicle is temporarily or permanently retrofitted with a modular heating device in order to adapt the vehicle for low temperatures.

There are a lot of options for the design of the heating device and for the coupling or integration of the heating device with other elements of the lift axle valve unit. For one preferred embodiment of the invention, the housing of the lift axle valve unit (e.g. an outer wall or an interior wall) comprises a recess. The heating device comprises a heating element. The heating element is located in the recess of the housing providing a transfer of heat from the heating element to the housing. For a good transfer of heat from the heating element to the housing the heating element might be in close contact with the housing in the recess with a minimization of an air gap or the provision of a close fit or a contact force. Furthermore, it is also possible to improve the transfer of heat between the heating element and the housing by using a transfer body or intermediate body between heating element and housing. This body might be a thermal contact element, a fluid or pasty medium introduced during the assembly and hardening or an elastic transfer element or the like.

The invention also suggests using a heating device with a heating element of the type of a "heating mat". The heating mat might comprise an increased contact surface with a contact surface of the housing for providing a good transfer of heat. It is possible that the heating mat contacts the outer side of an outer wall of the housing. However, It is also possible that the heating mat is integrated into the interior of the housing and contacts an inner side of the outer wall of the housing. Furthermore, it is possible that the heating mat contacts an interior wall of the housing.

Generally, the heating element might be located at any position of the lift axle valve unit. Heat might at least partially be transferred from the heating element to valve elements of the lift axle valve unit, to recesses of the housing for the valve element and the like by the stream of pressurized air in the lift axle valve unit and/or by a convective flow of heat in the housing or in other pneumatic elements of the lift axle valve unit.

When intending to keep the transfer paths as short as possible, the invention for one embodiment suggests locating a heating element adjacent a valve element to be heated. In case that it is intended to heat a plurality of valve elements, it is also possible to use a plurality of heating element wherein every heating element is located close to an associated valve element. For one embodiment of the invention, one single heating element is located between at least two valve elements of the lift axle valve unit. In this case, one single heating element is used in a multifunctional way for heating at least two valve elements with short transfer paths from the heating element to the valve elements. It is possible that the heating element is located in a common plane of two valve elements, in particular in the middle between two longitudinal axes or actuation axes of the valve elements. In case of intending to heat three or more valve elements, it is also possible to locate these three or more valve elements spatially around the heating element.

For the actuation of the heating device there are a plurality of options. To mention only some non-limiting examples, the heating device might be actuated manually by the driver or any other person. In this case, the driver or other person decides when an actuation of the heating device is required. This decision might be made on the basis of a measured or sensed environmental temperature or on the basis that the driver observes that the lift axle valve unit does not operate properly. Furthermore, it is also possible that an information is automatically given to the driver that an actuation of the heating device seems to be advisable. This might be done by an acoustic or optical warning signal. In these cases, a manual actuation of the heating device might activate an electric power supply of the heating device. However, it is also possible that an automatic actuation of the electric power supply is done by a control unit located externally from the lift axle valve unit in case that a measured environmental temperature gets lower than a given threshold. It is also possible that the heating device is automatically actuated if (by other measurements or observation measures) it is detected that the lift axle valve unit is not in the required or desired operating state.

For an actuation of the heating device, a temperature sensor might be located at any position of the utility vehicle, in particular within or at the lift axle valve unit. For another embodiment of the invention, the heating device itself comprises a temperature sensor. This embodiment results in a very compact design. In case that the heating device is built in modular form and only used as a component of the lift axle valve unit when necessary, the module at the same time houses both the heating element and the temperature sensor. Accordingly, the manufacturing effort, the storage requirements and the assembly effort are reduced.

For another embodiment of the invention, the temperature sensor is built with a temperature switch. The temperature switch activates the heating element in case that an activation threshold of the temperature of the temperature switch (and of adjacent components of the lift axle valve unit) gets lower than a threshold temperature. A temperature switch might be a cheap but safe embodiment of a temperature sensor. To mention only one not limiting example, the temperature switch might be built with a bimetallic switching element. It is also possible that an output signal depending on the operating state of the temperature switch is fed to a control unit of the lift axle valve unit or to an external control unit. The control unit actuates another switching element of the heating device for actuating the heating element.

For another embodiment of the invention, the temperature switch of the heating device interrupts a permanent electrical power supply of the heating device and the heating element if the temperature is above an actuation threshold. In case that the temperature becomes lower than the actuation threshold, the heating element is supplied with electrical energy for increasing the temperature. For this embodiment, it is only required to provide an electrical power supply for the heating device of the lift axle valve unit without any additional control port.

It is also possible that the temperature switch deactivates the heating element in case that the temperature exceeds a deactivation threshold. The deactivation threshold of the temperature might be higher than the activation threshold of the temperature for building a kind of hysteresis for the switching state of the temperature switch in dependence on the temperature. According to the invention, it is possible to activate the heating element if the temperature becomes lower than the activation threshold for heating the lift axle valve unit (and indirectly for heating the temperature switch). If this heating procedure the temperature exceeds the deactivation threshold (which guarantees a proper operation of the lift axle valve unit), the heating device is automatically deactivated in order to avoid an excess heating and/or in order to reduce the electrical energy consumption.

Another inventive measure considers the finding that for the operational safety of the utility vehicle, for the provision of the brake force and for the wear of the wheels it is more critical if the lift axle is not lowered at low temperatures with increased load than that there is no lifting of the lift axle for small loads. On the basis of this finding, the invention minimizes the electrical power consumption by the heating device by using any type of control unit that only activates the heating device in case that the lift axle valve unit is in a switching state with lifted lift axle.

The activation of the heating device might also depend on any other operational or environmental state or condition. For one embodiment of the invention, the activation of the heating device depends on the activated ignition for avoiding that a vehicle battery is unloaded by the heating device without running combustion engine.

Generally, for the heating device any power supply might be used (e.g. a separate battery or accumulator, a battery or accumulator integrated into the heating device or into the lift axle valve unit). It is also possible that the heating device is supplied with electrical energy from a central battery or accumulator and/or directly from an electric generator of the vehicle which is driven by the combustion engine.

Generally, it is possible to position at least one heating element at any position at or within the lift axle valve element. One embodiment of the invention suggests to locate at least one heating element in a damping reservoir of the list axle valve unit. Investigations of the inventors have shown that a damping reservoir is a good place for locating the heating element, wherein the reservoir supplies constructive space for the heating element. Furthermore, with the location of the heating element in the damping reservoir a convection from the heating element via an attachment with walls limiting the damping reservoir and/or a thermal heating of the pressurized air in the damping reservoir with a transportation of the heated pressurized air to valve elements might be used.

A multifunctional heating element is given in case that (additional to the aforementioned functions) the heating element is also used for building a throttle or for limiting a throttling cross-section within the damping reservoir.

The heating device used for the invention might comprise a control port for an activation and a deactivation of the heating device. Furthermore, the heating device might comprise a port for an electric power supply and/or an output port for an operating signal of the heating device or for a signal of a temperature sensor or temperature switch and the like. The aforementioned ports might be built by single ports, plugs or interfaces or by one single combined plug or interface. The at least one port might be connected with an associated port of the lift axle valve unit for building a connection with an input or output port of the lift axle valve unit. It is also possible that the heating device communicates with a bus system or CAN in any design.

Within the heating device only one single heating element or a plurality of heating elements of one and the same design or of different designs might be used.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

The present invention might be used in combination with lift axle valve units of any known type or design. Accordingly, in FIGS. 1 to 4 lift axle valve units 1 are shown with different designs of a base module 2 or base body for the provision of the lift axle lifting function.

Figure 1:
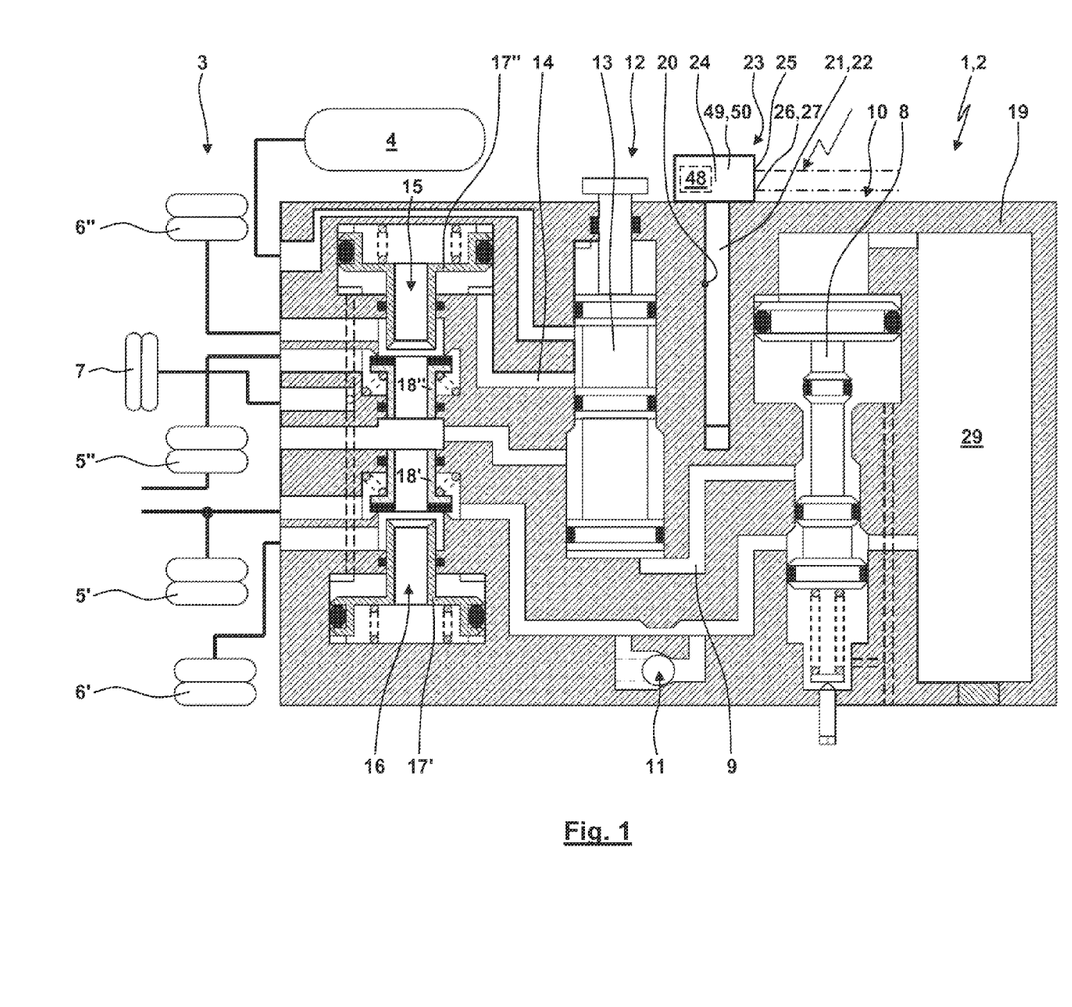
FIGS. 1 to 4 schematically show different embodiments of inventive lift axle valve units integrated into an air suspension device of a utility vehicle comprising a lift axle.

The base module 2 of the lift axle valve unit 1 according to FIG. 1 corresponds to a lift axle valve which is in more detail described in German Patent No. DE 43 14 994 C1. Further details and embodiments for base modules 2 of lift axle valve units 1 usable within the frame of the present invention can be found in particular in German Patents Nos. DE 43 14 994 C1, DE 44 10 892 C2 and DE 40 37 461 C1.

An air suspension 3 of a utility vehicle according to FIG. 1 is built with a reservoir 4, an inventive lift axle valve unit 1, air suspension bellows 5', 5" of different sides of at least one axle which is permanently in contact with the road, air suspension bellows 6', 6" of different sides of a lift axle and at least one lift bellow 7 for lifting and lowering the lift axle. The lift axle valve unit 1 activates the lift axle with a deaeration of the lift bellow 7 and an aeration of the air suspension bellows 6', 6" in case that the activation of the lift axle is required due to an increased load of the vehicle. With the activation of the lift axle, the lift axle valve unit 1 provides a pneumatic connection of the air suspension bellows 5', 5" with the air suspension bellows 6', 6" in order to divide the axle load. For this function of the lift axle valve unit 1, an actuation of pneumatic elements of the lift axle valve unit 1 is provided. For the embodiment shown in FIG. 1, this actuation is a pure pneumatic actuation. However, this is not necessarily the case.

Components that have to change their operating states or positions for the provision of the functions of the lift axle valve unit also for low temperatures are in particular the following components:

A control valve 10 with a control piston 8. The operating state of the control piston 8 corresponds to a first operating state shown in the figure in case that the load of the vehicle and the pneumatic pressure in the air suspension bellows 5', 5" is below a threshold. Instead, the control piston 8 is transferred into a second operating state in case that the load and the pneumatic pressure of the air suspension bellows 5', 5" is above the aforementioned threshold. In the first operating state, the control piston 8 deaerates a control line 9. In the second operating state, the control line 9 is aerated. In the shown embodiment, the aeration is done by connecting the control line 9 with the air suspension bellows 5', 5". However, it is also possible to use another pressurized air source for the aeration.

A check valve 11 located parallel to the connecting line between the air suspension bellows 5" and the control valve 10.

A lift axle valve 12 with a switching piston 13, which is also manually actuatable. The switching piston 13 is biased by the pressure of the control line 9. With a change of the operating state of the control valve 10, a changed operating state of the lift axle valve 12 is caused. In the shown first operating state of the switching piston 13, the lift axle control line 14 is connected with the reservoir 4. Instead, in the second operating state of the switching piston 13 (not shown in FIG. 1) the lift axle control line 14 is connected with a deaerating port.

Switching valves 15, 16 being connected with the lift axle control line 14 and controlling the pneumatic actuation of the lift bellow 7. On the other hand, each switching valve 15, 16 is responsible for the pneumatic actuation of an air suspension bellow 6', 6" of an associated side of the vehicle. The switching valves 15, 16 each comprise a switching piston 17', 17" as well as a double valve body 18', 18". The operating states of the switching pistons 17', 17" and the double valve bodies 18', 18" changes in response to the pressure in the lift axle control line 14 and in the air suspension bellows 5', 5", 6', 6".

Further details and modifications can be taken from German Patent Nos. DE 40 37 461 C1, DE 43 14 994 C1 and DE 44 10 892 C2.

The base module 2 is built with a housing 19 which is schematically shown in FIG. 1. Here, the housing 19 is built with a plurality of parts with intermediate walls and might have any geometry. For the embodiment shown in FIG. 1, the mentioned pneumatic elements are located in a common plane. However, the person with ordinary skill in the art will know that for a more compact design it is also possible to locate the pneumatic elements in a plurality of planes or to choose a three-dimensional design. It is possible that the base module 2 is built with a plurality of sub-modules that might be positioned within another sub-module or might be attached at another sub-module (e.g. by a flange). With the attachment or the connection of at least one flange it is also possible to provide pneumatic connections and seal these connections.

The housing 19 comprises a recess 20 which is open to the exterior and extends into the interior of the housing 19. The recess 20 might be a bore of a wall of the housing 19. It is also possible that the recess 20 is built at an interstice of two parts of the housing, wherein in this case the recess 20 might also be built or limited by two parts of the housing. A heating element 21 (here a heating rod 22) of a heating device 23 extends into the recess 20. In the region limiting the recess 20 the heating element 21 builds a small gap or a large contact surface with the housing 19. At the front surface of the heating element 21, an empty volume might remain in the recess 20. However, it is also possible that this empty volume is connected pneumatically with a pressurized air channel or a pressurized air chamber of the lift axle valve unit 1 so that pressurized air interacts with the front surface of the heating element 21. The heating device 23 comprises a base body 24 which is connected with the heating element 21 or carries the heating element 21. The base body 24 might alternatively or cumulatively provide the following functions:

building or housing a port 25 for an electric power supply, a control port 26 for the heating device 23 and an output port 27 for transferring an operating state of the heating device 23 to other components or control units;

housing of a control unit 48, in particular an ECU;

provision of a mounting or fixing of the heating device 23 at the housing 19.

For one embodiment (not shown), the base body 24 might comprise bores or a flange for screwing the heating device 23 with the housing 19.

According to the embodiment shown in FIG. 1, the control piston 8 and the switching piston 13 comprise parallel longitudinal axes, symmetry axes and actuation axes. The heating element 21 and the recess 20 extend parallel to the longitudinal axes and actuation axes of the control piston 8 and the switching piston 13. Furthermore, the heating element 21 and the recess 20 extend within the plane spanned by the longitudinal axes and symmetry axes as well as the actuation axes of the control piston 8 and the switching piston 13. The recess 20 and the heating element 21 are preferably located centrally between these longitudinal axes and actuation axes. With a heating of the heating element 21, heat is transferred from the heating element 21 to the housing 19 via the limiting surfaces of the recess 20 built by the housing 19. Accordingly, housing 19 and with the housing 19 also the control valve 10 and the lift axle valve 12 are heated. The required time duration for a desired temperature change might depend on the material properties, the thermal capacity, the transfer cross-sections and the power of the heating element 21.

Figure 2:
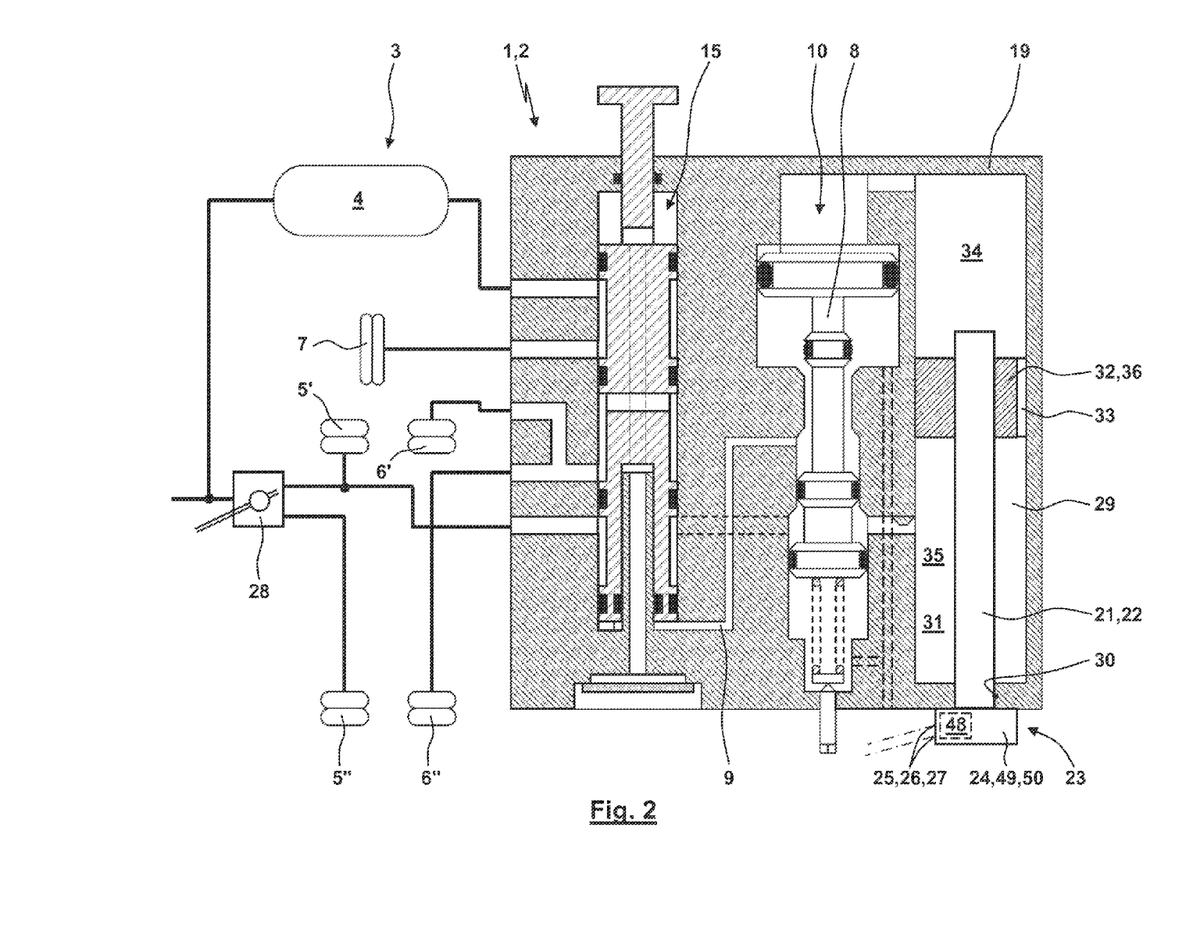

FIG. 2 shows an embodiment of the invention, wherein (differing from FIG. 1) the base module 2 of the lift axle valve unit 1 is built without a lift axle valve 12. Instead, here the control valve 10 directly controls one single switching valve 15 (without the interposition of a lift axle valve 12). Additionally, here the air suspension bellows are biased via a mechanical level control valve 28. A manual actuation of the lift axle valve 12 might provide the start-up of the vehicle in wintertime as explained above. For the embodiment shown in FIG. 2, the manual actuation for providing the start-up is directly provided by an actuation means or a button at the switching valve 15.

For the shown embodiment, the lift axle valve unit 1 comprises a damping reservoir 29. The damping reservoir 29 is pneumatically connected with an air suspension bellow 5' or with the output of the level control valve 28. Via a throttle 33 the damping reservoir 29 biases a front surface of the control piston 8. The damping reservoir 29 serves for decoupling a pneumatical actuation of the control piston 8 from short time dynamical oscillations of the pressure in the air suspension bellow 5'. According to FIG. 2, the heating element 21 is integrated into the damping reservoir 29. Also here, the base body 24 is fixed at the housing 19. The heating element 21 extends through a through-bore 30 of a wall of the housing 19 into an interior space 31. Here, the outer surface of the heating element 21 interacts with the pressurized air and heats the pressurized air. The heated pressurized air might be transferred by the shown pneumatic lines to other components of the lift axle valve unit 1. In an end region facing away from the base body 24, the heating element 21 extends through an intermediate wall 32 of the damping reservoir 29. The intermediate wall 32 builds a throttle 33 (here with a gap built in the intermediate space between the intermediate wall 32 and the housing 19). The throttle 33 separates chambers 34, 35 of the damping reservoir 29. The throttle 33 throttles the transfer of pressurized air between the chambers 34, 35. The air suspension bellow 5' is pneumatically connected with chamber 35. Furthermore, via the throttle 33 the air suspension bellow 5' is also connected with the chamber 34. Chamber 34 biases a frontal control surface of the control piston 8. Another control surface is biased by the pressure in chamber 35 or the pressure of the air suspension bellow 5'. Accordingly, the operating state of the control piston 8 depends on the mentioned two pressures. For the shown embodiment, the intermediate wall 32 of the damping reservoir 29 is built by a heat transfer body 36 which is a part of the heating device 23. The heat transfer body 36 is attached or fixed at an inner wall of the damping reservoir 29 and in particular at the housing 19. The heat transfer body 36 builds the throttle 33 or limits a throttle cross-section of the throttle 33. The heat transfer body 36 provides a transfer of heat from the heating element 21 via the contact with the inner wall of the damping reservoir 29 to the housing 19, so also to other pneumatic elements, in particular to the control valve 10.

Figure 3:
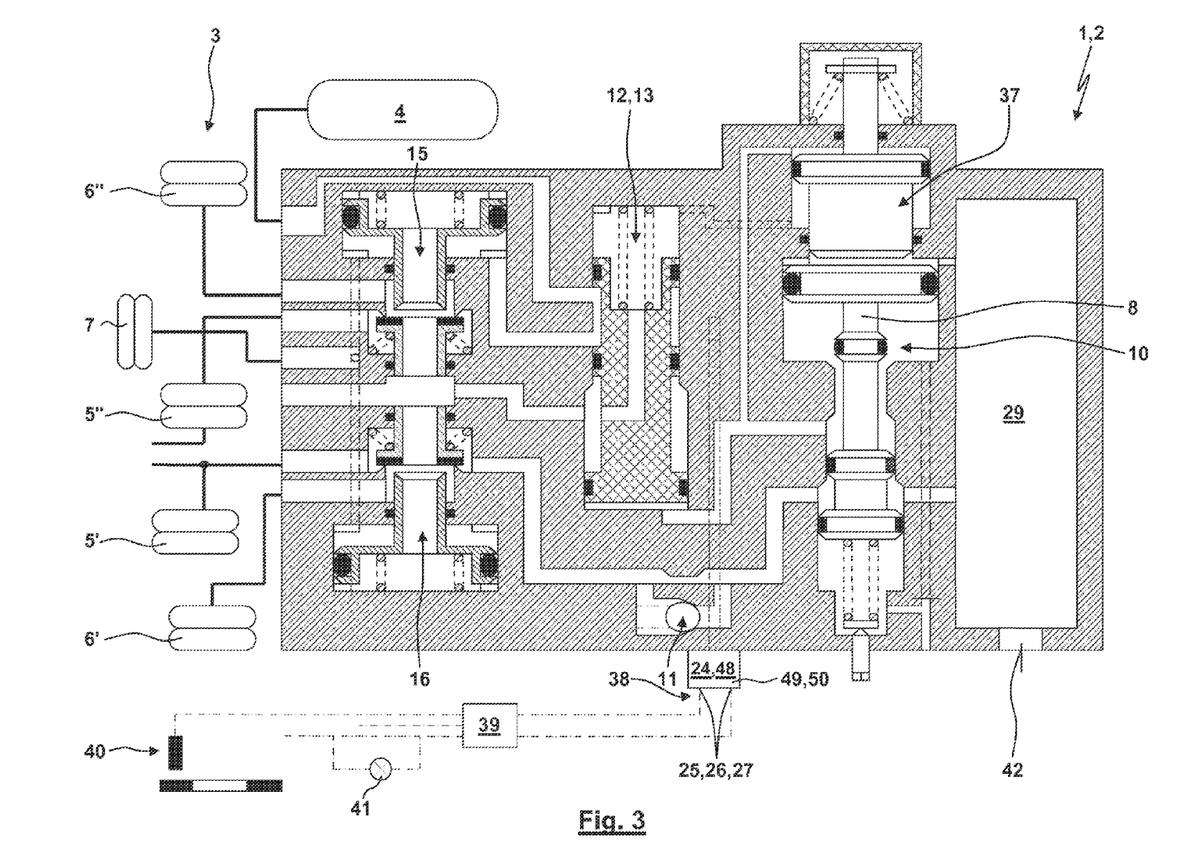

FIG. 3 shows an embodiment of the lift axle valve unit 1 generally corresponding to the embodiment shown in FIG. 1. However, here the control valve 10 is built with an additional pneumatically controlled biasing piston 37. Further details to the biasing piston 37 can be taken from embodiments disclosed in patents DE 40 37 461 C1, DE 43 14 994 C1 and DE 44 10 892 C2. For these embodiments, the ports 25, 26, 27 build an interface 38 for a control unit 39, in particular an ECU. The control unit 39 controls the electric power supply of the heating device, the activation and deactivation of the heating device and processes output signals of the heating device 23. In particular, the control unit 39 communicates via at least one plug with the interface 38, so with the heating device 23. The control unit 39 receives a signal from a rotational speed sensor 40, in particular an ABS-/EBS-sensor in connection with a corresponding pulse wheel. Accordingly, the control unit 39 is aware of a velocity signal of a wheel of the vehicle. In case that a sensor (or a temperature switch integrated into the heating device 21) of the control unit 39 detects a temperature which is too low for a safe operation of the lift axle valve unit 1 and in case that the rotational speed sensor 40 indicates the start of the driving operation of the vehicle, the control unit 39 by a suitable optical or acoustical signal or display, in particular a warning light 41, brings to the attention of the driver that the use of the lift axle valve unit 1 might be impacted. It is also possible that a pneumatic pressure and/or a state or position of a valve element of the lift axle valve unit 1 is directly transferred to the control unit 39. From these signals, the control unit 39 might directly decide whether there is a malfunction of the lift axle valve unit 1 or not. The control unit 39 might directly trigger suitable measures as the activation of the heating device 23 and/or warning signals for the driver. It is also possible that other communication options as a communication via CAN or PLC are used for an exchange of the aforementioned data, in particular for bringing information to the attention of the driver. For the shown embodiment according to FIG. 3, the damping reservoir 29 comprises an output port 42 for a connection with other valves (e.g. with a shut-off cock or a test port).

Figure 4:
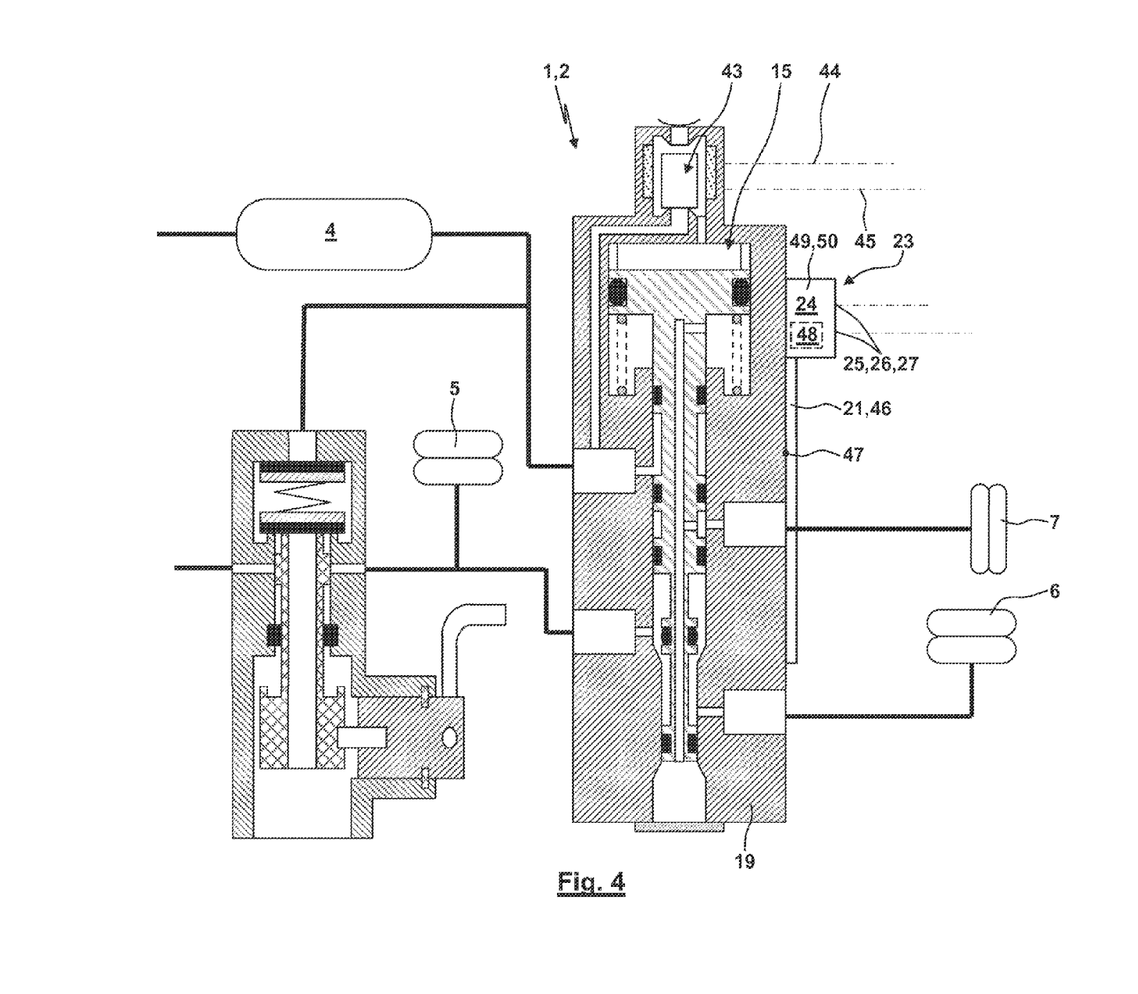

FIG. 4 shows another embodiment of a lift axle valve unit 1, wherein a switching valve 15 is electrically actuated. Here, the lift axle valve unit 1 comprises an electrically actuated solenoid valve 43. The solenoid valve 43 is controlled by a control unit (not shown) via control lines 44, 45. The solenoid valve 43 aerates and deaerates a control chamber for switching the switching valve 15 in dependence on the control signal in the control lines 44, 45. For the embodiment shown in FIG. 4, the heating device 23 is built with a heating element 21 formed by a heating mat 46. For the provision of the required transfer surfaces for the heat, the heating mat 46 contacts with a large contact surface at a contact surface 47 which is built by the outer surface of the housing 19. The application or fixation of the heating mat 46 might be simplified in case that the contact surface 47 of the housing 19 is plane or smoothly curved. Also in this case, the heating device 23 communicates via ports 25 to 27 with the control unit and/or the electric power supply. It is also possible that one single common control unit is both responsible for the control of the heating device 23 as well as for the control of the solenoid valve 43. According to FIG. 4, the heating mat 46 is fixed at the outer surface of the housing 19. However, it is also possible that the heating mat 46 is fixed or attached at an inner surface of the housing or at an intermediate wall of the housing.

The inventive heating device 23 might have a heating power of 120 Watt, whereas also differing heating powers, in particular 200 Watt, 180 Watt, 150 Watt, 140 Watt, 130 Watt, 110 Watt, 100 Watt, 80 Watt or 60 Watt, might be used. For a preferred embodiment, the heating device 23 is supplied with 12 Volt by the on-board supply system of the vehicle. However, also any other supply voltage might be used, in particular 24 Volt.

For one example, the heating device 23 is activated in case that the temperature becomes smaller than an activation threshold of −40° C. For an alternative embodiment, the activation threshold for the temperature for activating the heating device 23 is −20° C., whereas a deactivation threshold of the temperature for deactivating the heating element is −15° C. However, any other activating threshold and/or deactivating threshold might be used.

It is also possible that the activation of the heating device 23 is dependent on the load of the vehicle. This embodiment bases on the finding that for loads that normally trigger a lowering of the lift axle any fault due to the low temperatures having the result that the lift axle in fact is not lowered might be accepted if the load is only for a given amount larger than the load triggering the lowering of the lift axle. However, for a larger amount of an excess of the threshold the heating device 23 is activated.

Within the frame of the present invention, heating devices as a so called electrical PTC-heating device (positive temperature coefficient) with an automatic control might be integrated into the lift axle valve. Some of these heating devices are disclosed in German Patent Application Nos. DE 10 2007 005 771 A1 (corresponding to US Patent Application No. US 2008/0197064 A1) and DE 10 2006 034 077 A1 (corresponding to US Patent Application No. US 2010/0200485 A1), wherein in these patent applications the heating devices are used for other purposes.

It is possible that the heating device 23 is permanently connected with the electric power supply. In other cases the connection depends on the activation of the ignition. For these embodiments the invention also suggests to integrate a temperature sensor 49 (in particular a temperature switch 50 or a thermostat) into the heating device 23 (in particular into the base body 24). In case that the temperature falls below the activation threshold, the temperature sensor 49 opens the connection for the electric power for heating the heating element 21. It is possible that the heating element 21 is heated to a temperature of approximately 650° C. Furthermore, it is possible that the heating element 21 is activated in dependence on a temperature which is measured at a component of the lift axle valve unit 1 or at any other place at the utility vehicle.

The inventive lift axle valve builds a unit separate from other units, in particular separate from an air treatment module. The lift axle valve unit is located remote from the air treatment module, in particular close to the lift axle. The lift axle valve unit is in particular located downstream from (multi) protection valves and/or downstream from an air reservoir of the air suspension system.

Many variations and modifications may be made to the preferred embodiments of the invention without departing substantially from the spirit and principles of the invention. All such modifications and variations are intended to be included herein within the scope of the present invention, as defined by the following claims.

We claim:

1. A lift axle valve unit for a utility vehicle comprising an air suspension, wherein said lift axle valve unit comprises an electric heating device, and wherein said electric heating device comprises a heating element, said heating element being located in a recess of a housing of said lift axle valve unit and between at least two valve elements of said lift axle valve unit.

2. The lift axle valve unit of claim 1, wherein said heating device is built by a module.

3. A lift axle valve unit for a utility vehicle comprising an air suspension, wherein said lift axle valve unit comprises an electric heating device, wherein said heating device comprises a heating element, said heating element being built with a heating mat contacting a contact surface of a housing of said lift axle valve unit.

4. A lift axle valve unit for a utility vehicle comprising an air suspension, wherein said lift axle valve unit comprises an electric heating device, wherein said electric heating device comprises a temperature sensor.

5. The lift axle valve unit of claim 4, wherein said temperature sensor comprises a temperature switch, said temperature switch activating said electric heating device if the temperature is lower than an activation threshold.

6. The lift axle valve unit of claim 4, wherein said temperature sensor comprises a temperature switch, said temperature switch deactivating said electric heating device if the temperature exceeds a deactivation threshold.

7. The lift axle valve unit of claim 5, wherein said temperature sensor comprises a temperature switch, said temperature switch deactivating said electric heating device if the temperature exceeds a deactivation threshold.

8. A lift axle valve unit for a utility vehicle comprising an air suspension, wherein said lift axle valve unit comprises an electric heating device, and wherein a control unit is provided, said control unit deactivating said heating device if said lift axle valve unit is in a switching state with lowered lift axle.

9. A lift axle valve unit for a utility vehicle comprising an air suspension, wherein said lift axle valve unit comprises an electric heating device, and wherein an activation of said heating device is dependent on an activation of the ignition of the combustion engine.

10. A lift axle valve unit for a utility vehicle comprising an air suspension, wherein said lift axle valve unit comprises an electric heating device, and wherein said electric heating device is located in a damping reservoir.

11. The lift axle valve unit of claim 10, wherein said heating device comprises a throttle.

12. A lift axle valve unit for a utility vehicle comprising an air suspension, wherein said lift axle valve unit comprises an electric heating device, and wherein said heating device comprises at least one element of the group built with a control port, a port for an electrical power supply and an output port.

* * * * *